United States Patent [19]
Scheckler et al.

[11] Patent Number: 5,384,047
[45] Date of Patent: * Jan. 24, 1995

[54] FILTER DRYER BODY

[75] Inventors: Chad A. Scheckler, Phelps; Jeffrey J. Yost; Jon D. Gould, both of Lyons, all of N.Y.

[73] Assignee: Refractron Technologies Corporation, Newark, N.Y.

[ * ] Notice: The portion of the term of this patent subsequent to May 19, 2009 has been disclaimed.

[21] Appl. No.: 7,473

[22] Filed: Jan. 22, 1993

[51] Int. Cl.6 .............................................. B01D 69/00
[52] U.S. Cl. .................... 210/490; 210/496; 210/500.1; 210/500.25; 210/500.26
[58] Field of Search ............... 502/402, 415, 416; 427/221, 222; 210/490, 496, 500.1, 500.25, 500.26, 500.27, 500.36, 510.1; 95/188, 189

[56] References Cited
U.S. PATENT DOCUMENTS

| | | |
|---|---|---|
| 3,354,129 | 11/1967 | Edmonds . |
| 3,573,158 | 3/1971 | Pall et al. . |
| 4,270,933 | 6/1981 | Meny et al. . |
| 4,522,875 | 6/1985 | Still ..................... 427/221 |
| 4,650,757 | 3/1987 | David et al. ................ 435/837 |
| 4,665,050 | 5/1987 | Degen et al. ................ 502/402 |
| 5,114,584 | 5/1992 | Sheckler et al. ............. 210/490 |

OTHER PUBLICATIONS

Zeochem Bullentin, "Molecular Sieves for the Natural Gas, Petroleum Refining, and Petrochemical Industry," Bullentin #Z1088, 1988.
Modern Plastics, Mid-Oct. 1991, pp. 76-78, 690, and 696-697.

*Primary Examiner*—Robert A. Dawson
*Assistant Examiner*—W. L. Walker
*Attorney, Agent, or Firm*—Howard J. Greenwald; James F. Mudd

[57] ABSTRACT

A filter body comprised of molecular sieve material and polyphenylene sulfide is disclosed. This filter body has a density of from about 10 to about 25 grams per cubic inch, a compressive strength of at least about 500 pounds per square inch, a pressure drop of from about 5 to about 20 inches, a water pickup of at least about 11 weight percent, and an initial 24-hour water pickup of at least about 6 weight percent.

18 Claims, 2 Drawing Sheets

FILTER DRYER BODY

FIELD OF THE INVENTION

A porous, adsorbent filter body containing molecular sieve material and a minor amount of polyphenylene sulfide material.

BACKGROUND OF THE INVENTION

Bonded molecular sieve materials of the zeolite family are well known to those skilled in the art. These natural and synthetic materials, having different particle sizes and pore sizes, are hydrated metal alumino silicates.

It has been known for many years that molecular sieves have excellent adsorptive properties. Thus, molecular sieve materials have been used in desiccant filters. These desiccant filters have often been comprised of a metallic cartridge or vessel filled with loose, activated particles of sorbent, such as molecular sieve material. However, as is disclosed in U.S. Pat. No. 3,235,089 of Burroughs, the use of such loose sorbent particles has the following disadvantages: "(1) a tendency to develop channels, (2) attrition between individual particles which causes powdering and packing with a resultant change in the penetrability of the unit and also a lessening of desiccant properties, and (3) formation of strata in the bed due to classification which occurs during use . . ." (see column 1, lines 21-30)

Because of the problems with the use of loose sorbent particles in desiccant filters, attempts have been made to produce monolithic filter bodies of molecular sieve material. However, the prior art discloses that it is very difficult to make a filter body high in molecular sieve content which will effectively utilize the adsorptive properties of these materials.

In 1961, in U.S. Pat. No. 2,973,327, Mitchell et al. disclosed that it is difficult to agglomerate molecular sieve because ". . . the alkalinity of the sieve . . . tends to destroy or weaken many common types of binders . . . . In the presence of water, the molecular sieves dilate and thus resist compaction forces . . . (see column 1, lines 57-63)"

In 1962 it was disclosed that filter bodies which contained a substantial amount of molecular sieve material are ineffective. In his U.S. Pat. No. 3,025,233, Figert disclosed (at 1 lines 61-66 of column 3) that ". . . crystalline zeolite molecular sieves have . . . limited filtering ability, when used alone, to provide full fluid flow with a negligible pressure drop and provide the retention of finely divided particulate matter . . . ." Figert's solution to this problem was to provide a porous barrier which contained from 7 to 31 percent of a crystalline zeolite molecular sieve, from 39 to 93 percent of activated alumina, and an inert binder which could be organic or inorganic.

By no later than 1966 it was recognized that prior art binding techniques were ineffective in making shaped bodies consisting of molecular sieve. In their U.S. Pat. No. 3,262,890, Mitchell et al. taught (at lines 34-42 of Column 1) that "The prior art has employed shaped molecular sieve bodies consisting of hydrated alumina particles and 5 to 10 percent zeolite 4A particles with cellulose acetate or calcium aluminate. These bodies or blocks are shaped to fit in the sealed refrigerant cartridges. However, when the blocks are sectioned, it is found that the molecular sieve particles are quite easily dislodged from the mass." The patentees also disclosed (at lines 47-56 of column 1) that "Attempts to bind 14×30 mesh zeolite type 4A particles with calcium aluminate cement, or calcium aluminate and sodium silicate have proved unsuccessful. It appears that the alkaline nature of the molecular sieve particles adversely affects the binders, and that conventional binding techniques are not suitable for preparing shaped bodies containing uniformly dispersed molecular sieves." The solution to this problem presented in U.S. Pat. No. 3,262,890 was to provide a green body containing clay mineral binder and sodium silicate and to thereafter fire this body at a temperature of from about 662 to about 1,202 degrees Fahrenheit.

By no later than 1969, another problem with the use of molecular sieve material was recognized. In his U.S. Pat. No. 3,446,645, Wilfred Drost disclosed (at lines 45-49 of column 1) that ". . . under some conditions, halogenated derivatives of ethane and methane employed as refrigerant gases are decomposed to some extent by a number of prior known molecular sieve agglomerates used as desiccants in the system."

This decomposition problem was again referred to in 1970. In their U.S. Pat. No. 3,536,521, Robert W. McKinney et al. disclosed (at lines 35-40 of column 1) that ". . . the Freons . . . used in refrigerant systems react at active sites on a molecular sieve surface with subsequent decomposition into halogen acids which react with the basic structure of the molecular sieve."

A self-supporting structure containing molecular sieve and thermoplastic material was disclosed in U.S. Pat. No. 4,665,050 of Degen et al. In the process of this patent, a sorbent (such as molecular sieve) with a particle size in the range of from 1 to 10 millimeters was preheated, and the preheated particles were then mixed with from about 1 to about 7 weight percent of thermoplastic binder (such as polyethylene); thereafter, the sorbent/binder mixture was heated to about the solid-liquid transition temperature of the binding material. The body formed by this process, however, has poor mechanical properties.

In 1992, in their U.S. Pat. No. 5,114,584, applicants disclosed a filter body which contained at least about 75 weight percent of molecular sieve material and from about 9 to about 20 weight percent of nylon. Although the filter body of this invention was substantially superior to prior art filter bodies, it still suffered from certain disadvantages. In the first place, nylon is not stable when heated to its melting point in an oxygen-containing environment. In the second place, nylon is not chemically resistant to many species.

It is an object of this invention to provide an integral, porous body which contains at least about 75 weight percent of molecular sieve material.

It is another object of this invention to provide a filter body with excellent filtering properties.

It is another object of this invention to provide a filter body which will have a substantially greater capacity to pick up water than the filter body of U.S. Pat. No. 5,114,584.

It is another object of this invention to provide a filter body which will have better resistance to many chemical species than the filter body of U.S. Pat. No. 5,114,584.

It is another object of this invention to provide a filter body with excellent strength properties.

It is another object of this invention to provide a filter body with excellent desiccant properties.

It is another object of this invention to provide a filter body which is entirely compatible with refrigerant fluids.

It is yet another object of this invention to provide a filter body which will retain its mechanical properties even after it has been contacted with refrigerant fluid for a substantial period of time.

It is yet another object of this invention to provide a process for preparing a filter body which does not require the use of an inert or vacuum atmosphere.

It is yet another object of this invention to provide a process for bonding a molecular sieve composition to a substrate, such as metal.

It is yet another object of this invention to provide a composite article comprised of molecular sieve material bonded to a substrate.

SUMMARY OF THE INVENTION

In accordance with this invention, there is provided a porous filter body comprised of at least about 75 weight percent of molecular sieve and at least about 9 weight percent of polyphenylene sulfide.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
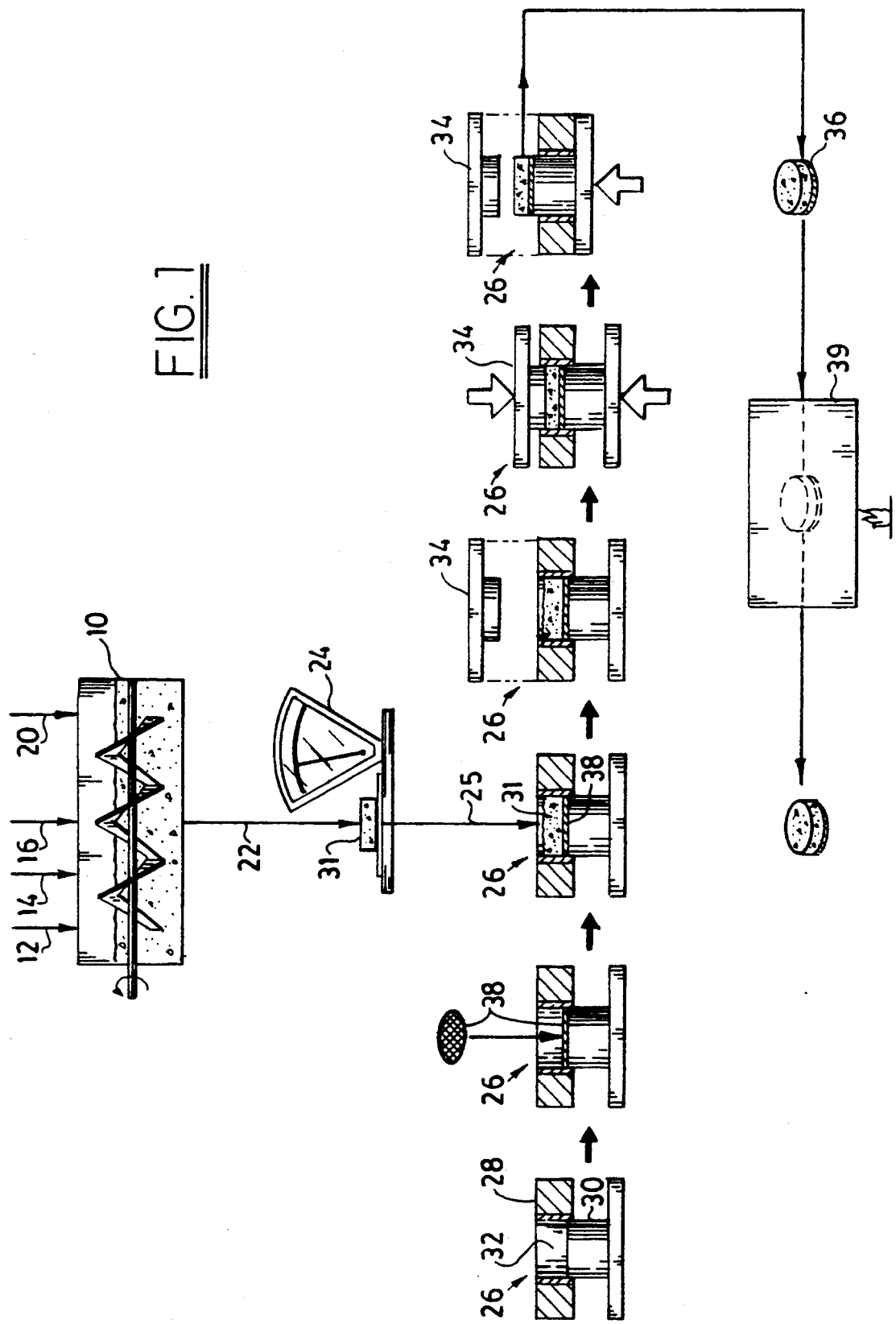
FIG. 1 is a flow diagram of one preferred process of this invention.

In the process of this invention, a molecular sieve material is mixed with a polyphenylene sulfide material.

As used in this specification, the term molecular sieve refers to a microporous material belonging to the zeolite family of minerals and synthetic compounds which is characterized by an aluminosilicate tetrahedral framework, ionexchangeable large cations, and loosely held water molecules permitting reversible dehydration. See, e.g., pages 696–698 of Volume 14 of the "McGraw-Hill Encyclopedia of Science & Technology" (McGraw-Hill, Inc., New York, 1977).

The activated molecular sieve material used in the process of this invention preferably has the formula $M_{2/n}O:Al_2O_3:SiO_2$, wherein: (1) M is a metal ion preferably selected from the group consisting of sodium, potassium, calcium, strontium, barium, cesium, magnesium, and mixtures thereof, and (2) n is the valence of the metal ion and is selected from the group consisting of 1 and 2.

When the molecular sieve is activated, it becomes dehydrated and contains substantially no water. When it is not activated, it may be represented by the formula $M_{2/n}O:Al_2O_3:SiO_2:H_2O$.

The zeolite family of minerals is well known to those skilled in the art. Thus, e.g., some members of this family include Analcime (M is Na), Wairakite (M is Ca), Pollucite (M is Cs), Edingtonite (M is Ba), Thomsonite (M is Na, Ca), Phillipsite (M is K, Na), Garronite (M is Na, Ca), Brewsterite (M is Sr), Ferrierite (M is Na, Mg), Paulingite (M is K, Ca), and the like.

In one preferred embodiment, M is selected from the group consisting of sodium, potassium, and mixtures thereof.

It is preferred that the molecular sieve material used in the process of this invention contain less than about 30 weight percent of $M_{2/n}O$, less than about 50 weight percent of silicon oxide, and less than about 40 weight percent of aluminum oxide, each by weight of the activated molecular sieve material.

In one preferred embodiment, the molecular sieve is a crystalline material having cubic crystals which range in size between 1 and 5 microns. The crystal structure consists basically of a three-dimensional framework of $SiO_4$ and $AlO_4$ tetrahedra, which are cross-linked by the sharing of oxygens. The electrovalence of the tetrahedra containing aluminum is balanced by the inclusion of sodium and/or potassium cations in the crystal. The configuration of the tetrahedra is such that the crystals are honeycombed with regularly spaced cavities interlaced by channels of molecular dimensions.

In one preferred embodiment, the molecular sieve used in the process of this invention has a structure such that substantially all of its pores are smaller than about 4 angstroms. In another embodiment, the molecular sieve used in the process of this invention has a structure such that substantially all of its pores are larger than about 4 angstroms. In yet another embodiment, the molecular sieve used in the process of this invention has a structure such that some of its pores are smaller than about 4 angstroms and some of its pores are larger than about 4 angstroms.

As is known to those skilled in the art, the complex crystals of molecular sieves form cages which are the basis of molecular adsorption, whereby adsorbed molecules occupy these cages. Thus, for example, potassium and sodium ions in the crystal cages give the cage opening different sizes, allowing "sieving" of different sized molecules. The potassium ion makes the cage opening about 3 angstroms in diameter. The sodium ion makes the cage opening about 4 angstroms in diameter. See, for example, Zeochem Bulletin No. Zi088, "Zeochem Molecular sieves for the natural gas, petroleum refining, and petrochemical industry" (Zeochem Company, Louisville, Ky.).

The molecular sieve material used in the process of this invention has a particle size distribution such that substantially all of its particles pass through a 9 mesh screen (2,000 microns) and are retained on a 60 mesh screen (250 microns); this material is referred to as having a 9×60 particle size. In other embodiments, the particle size of the sieve material is 9×20 (841 microns), 16 (1,000 microns)×40, 20×40, and the like. Molecular sieves with pore sizes smaller than about 4 angstroms are well known to those skilled in the art and may be purchased from many different vendors.

By way of illustration, one may use "Molecular Sieve Type 4AXH6," "Molecular Sieve Type 4AXH7," and "Molecular Sieve Type 4AXH9" each of which is available from the UOP Molecular Sieves of 25111 Country Club Boulevard, North Olmstead, Ohio.

By way of further illustration, one may use a Zeochem Molecular Sieve Type 4A. This material has the formula $Na_2O.Al_2O_3.2SiO_2.XH_2O$, a nominal pore diameter of 4 angstroms, a cubic crystal structure, a bulk density of 46 pounds per cubic foot, a theoretical equilibrium water capacity of 24 weight percent, and a water content (as shipped) of 1.5 weight percent (maximum).

By way of further illustration, one may use a Zeochem Molecular Sieve Type 3A. This material has the formula $(K_2O.Na_2O).Al_2O_3.2SiO_2.XH_2O$, a nominal pore diameter of 3 angstroms, a cubic crystal structure, a bulk density of 47 pounds per cubic foot, a theoretical equilibrium water capacity of 21 weight percent, and a water content (as shipped) of 1.5 weight percent (maximum).

In the process of this invention, the molecular sieve material is preferably mixed with a polyphenylene sulfide material.

As is known to those skilled in the art, polyphenylene sulfide is a crystalline/semicrystalline temperature- and chemical-resistant polymer having a chemical structure of the formula:

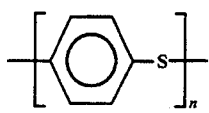

Polyphenylene sulfide has excellent chemical resistance to a wide range of polar and nonpolar solvents, mineral and organic acids, and alkalis. In addition, it is stable in air up to its melting point of about 550 degrees Fahrenheit. It also has good mechanical strength, thus making it a good bonding agent. See, e.g., page 76 of Volume 68, Number 11 (the mid-October, 1991 issue) of "Modern Plastics."

Polyphenylene sulfide is commercially available from many different vendors. Thus, referring to pages 696–697 of the mid-October, 1991 issue of "Modern Plastics," one may purchase polyphenylene sulfide from Advance Resins Corporation of Chicopee, Mass., from Alpha Precision Plastics, Inc. of Houston, Tex., from Bamberger Polymers Inc. of New Hyde Park, N.Y., from ICI Advanced Materials of Exton, Pa., and the like.

In one preferred embodiment, one may use a polyphenylene sulfide powder identified as "Nacote PRO-1 Resin" (which may be purchased from the Whitford Corporation of West Chester, Pa.). It is believed that this resin has a mean molecular weight of about 1,500 and a particle size distribution range of from about 2 to about 100 microns.

In place of the polyphenylene sulfide material, or in addition thereto, one may use other thermoplastic materials. Thus, by way of illustration, one may use a ketone-based resin such as, e.g., polyetherether ketone, polyether ketone, polyether sulfone, and the like. These ketone-based resins are commercially available (see page 690 of the mid-October 1991 issue of Modern Plastics) and may be obtained from, e.g., ICI Advanced Materials of Exton, Pa. Thus, e.g., PEEK (polyetherether ketone) is marketed by ICI under the tradename of "Victrex PEEK." Thus, e.g., PEK (polyether ketone) is marketed by ICI under the name of "Victrex PEK." Thus, e.g., PES (polyether sulfone) is marketed by ICI under the name of "Victrex PES."

In one preferred embodiment, the composition of this invention may be made by mixing from about 9 to about 20 weight percent of said polyethylene sulfide (and/or other thermoplastic) with the aforementioned molecular sieve material. In this embodiment, in general, it is preferred to deactivate the molecular sieve material by adding water to it and allowing it to sit under ambient conditions for several days. Thereafter, it is preferred to add additional water (from about 0 to about 25 percent), alumina (up to about 50 percent), and binder (up to about 10 percent) and to mix the reagents. Thereafter, the thermoplastic powder material (from about 8 to about 20 percent) is added to the mixture, the mixture is molded to its final shape, and the mixture is fired in an air atmosphere to a temperature of from about 600 to about 650 degrees Fahrenheit until bonding occurs and the deactivated molecular sieve material has been reactivated (i.e., it contains a moisture content of less than about 1.0 percent).

In one preferred process of this invention, the aforementioned molecular sieve is wetted with a deactivation agent. Thus, referring to FIG. 1, to the mixer 10 is charged molecular sieve (via line 12) and deactivation agent (via line 14).

The purpose of the deactivation agent is to deactivate the molecular sieve so that it will not react with water-containing reagents used in the process. Any of the deactivation agents known to deactivate molecular sieves can be used. Thus, by way of illustration, one may use water, an alcohol of the formula ROH wherein R is alkyl of from about 1 to 5 carbon atoms, mixtures of water and alcohol, and the like. A sufficient amount of the deactivation agent is preferably added to completely wet the surface of the molecular sieve material. Thus, e.g., in one embodiment, from about 30 to about 47 weight percent (by total weight of wetted material) of deactivation agent is added.

In one embodiment, a green binder is added to the molecular sieve material along with the deactivation agent (via line 14). In another embodiment, the green binder is added separately via line 16.

In general, from about 1 to 2 weight percent of such binder is added to the mixture.

In one embodiment, it is preferred that the binder used in the process have a particle size distribution such that substantially all of its particles are smaller than about 0.1 microns. Some of these preferred colloidal binders include colloidal silica, boehmite, and the like. Thus, e.g., one suitable boehmite binder is "DISPAL" 180 (available from Vista Chemical Company of Austin, Tex.).

Referring again to FIG. 1, after the molecular sieve and the wetting agent are charged to mixer 10, mixing occurs until a substantially homogeneous mixture occurs.

Once the mixture of molecular sieve and wetting agent has been formed, it is mixed with from 9 to about 20 weight percent (by total weight of mixture) of powdered thermoplastic material, such as the powdered polyphenylene sulfide material described above. This powdered thermoplastic material may be charged to mixer 10 via line 20.

After the thermoplastic material has been charged to mixer 10, the mixture so formed is mixed until a homogeneous mixture results.

The mixture of molecular sieve, water, green binder, and thermoplastic material is discharged via line 22 to scale 24, wherein it is weighed to a predetermined weight. Thereafter, it is transferred to press 26 wherein it is compacted in a die, using mechanical, pneumatic, or hydraulic pressure.

Referring again to FIG. 1, press 26 is comprised of case 28, bottom platen 30, press cavity 32, and top platen 34. The mixture 31 of molecular sieve, water, green binder, and thermoplastic material is transferred to die 32. Once mixture 31 is within press cavity 32, platen 30 and platen 34 compress it, thereby forming green body 36.

Green body 36 may consist essentially of the compressed mixture of the molecular sieve, water, green binder, and thermoplastic material. Alternatively, green body 36 also may contain a substrate material 38 attached to the compressed mixture of the molecular sieve, water, green binder, and thermoplastic material.

It is preferred that press 26 be a double-action press. The material is pressed to a given volume and density. In general, the material is pressed to a green density of from about 10 to about 26 grams per cubic inch.

The green body is then transferred to a furnace wherein it is heated to the melting/fusion temperature of the thermoplastic material. In one preferred embodiment, where polyphenylene sulfide is used as the thermoplastic material in the mixture, the temperature used is preferably from about 620 to about 650 degrees Fahrenheit. The heating may be conducted in an oxygen-containing atmosphere, such as air.

In general, the sample is heated until it contains less than about 1 weight percent of moisture, and preferably, less than about 0.5 weight percent of moisture. The dried sample is then removed from the furnace and packaged into a sealed container.

Figure 2:
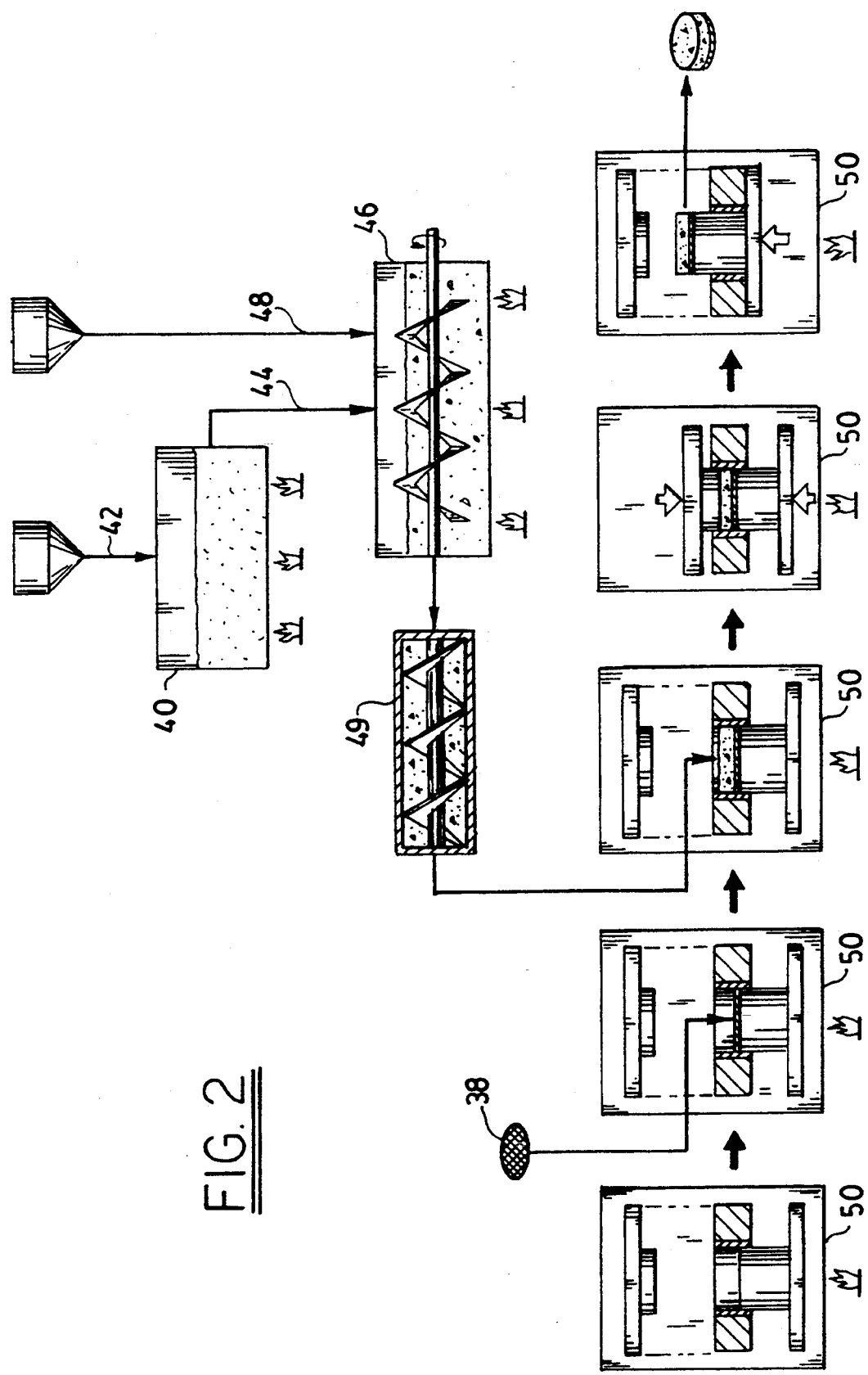
FIG. 2 is a flow diagram of another preferred process of the invention.

In an alternative process for preparing the porous body of this invention, which is illustrated in FIG. 2, the molecular sieve described above is first transferred to an oven 40 by line 42. In this oven it is preferably heated to a temperature at or above the melting temperature of the thermoplastic material.

The heated molecular sieve material is then transferred via line 44 to heated mixer 46. Into heated mixer 46, via line 48, is fed from about 9 to about 20 weight percent of the thermoplastic material (such as the polyphenylene sulfide material) described elsewhere in this specification. The mixing of the molecular sieve material and the thermoplastic material preferably occurs at or above the melting temperature of the thermoplastic material. The components are mixed until a homogeneous mixture is obtained.

The heated mixture from mixer 46 is then transferred to a mold 52 by conventional transfer means such as, e.g., a jacketed auger 49. The mold is heated to a temperature which preferably is from about 10 to about 30 degrees Fahrenheit lower than the temperature of the heated mixture. The hot material thus fed to the mold is then compacted until a molded article with a density of from about 10 to about 25 grams per cubic inch is produced.

In one embodiment of this invention, a bonded article comprised of molecular sieve and a substrate is provided.

As used in this specification, the term substrate refers to any material with a composition which is dissimilar to applicants' claimed filter body and which may, for example, consist of one or more metal screens, baffle plates, springs, vessel bodies, ceramically bonded filter dryer components (such as, e.g., those described in U.S. Pat. No. 3,235,089), and the like.

This bonded material may be provided by either of two processes. In the first process, where the molecular sieve is mixed with deactivating agent and binder, the substrate component is placed into the mold into which the mixture of molecular sieve/thermoplastic material/water/binder is to be charged. Thereafter, such mixture is charged to the mold, pressed, removed from the mold (together with the substrate part with which it is contiguous) and fired as described above.

In the second process, in which the molecular sieve material is preheated, the substrate part is placed into the heated mold into which the molten mixture of molecular sieve and thermoplastic material is to be charged. The combination of substrate/molecular sieve/thermoplastic material is compacted as before.

It will be appreciated that, with the inclusion of the substrate component in the mold or press, the final density to which the green body is pressed or molded may differ from the density desired when no such substrate part is in the mold or press. Thus, when applicants refer to a green body density and/or a compacted density, they are referring to the density of the molecular sieve/thermoplastic material component and not that of the substrate component. Those skilled in the art are well aware of means for measuring and determining the density of the molecular sieve/thermoplastic material component.

In one preferred embodiment, illustrated in the Figures, the substrate material is comprised of metal. Any metal material, in substantially any shape, may be introduced into the mold. Thus, by way of illustration and not limitation, one may use metal screen, metal plates, metal baffles, metal springs, and the like. Some preferred metals include aluminum, steel, copper, alloys thereof, and the like.

In place of, or in addition to the metal material, the substrate may contain ceramically bonded ceramic material. Thus, referring to the Figures, if such a bonded ceramic material is used as substrate 38, a composite material containing a ceramically bonded ceramic portion and a molecular sieve portion may be formed.

In one embodiment, a composite filter body is prepared which is comprised of both the molecular sieve filter body and, bonded thereto, another ceramic filter body.

The other ceramic filter body, which may be used as substrate 38, may be an adsorbent filter body comprised of at least about 50 weight percent of activated alumina. Such a filter body is described in U.S. Pat. No. 3,235,089, the disclosure of which is hereby incorporated by reference into this specification. In one aspect of this embodiment, adsorbent filter body 38 contains at least about 75 weight percent of activated alumina.

Other materials may be used as substrate 38. One of the unique properties of the mixture of polyphenylene sulfide and molecular sieve material is that it adheres to these other substrates just as readily as it adheres to metal and ceramic materials, forming a strong bond with such substrates. Thus, by way of illustration, such other substrate material 38 may be wood, plastic, and the like. The molecular sieve filter body produced by the process of this invention will generally have a density of from about 10 to about 25 and, preferably, from about 14 to about 25 grams per cubic inch. It usually will contain from about 9 to about 20 weight percent of thermoplastic material (and, preferably, from about 9 to about 14 weight percent of the thermoplastic material) and at least about 75 weight percent of the molecular sieve material. It is preferred that the filter body contain at least about 85 weight percent of the molecular sieve material.

The molecular sieve filter body produced by applicants' process generally has a compressive strength of at least about 500 pounds per square inch, and preferably, from about 500 to about 1,000 pounds per square inch.

The compressive strength of such filter body may be measured on a Carver Laboratory Press, Model Number 2901, equipped with a pressure gauge (Fred S. Carver, Inc., Summit, N.J.). The filter body to be tested is placed on the platen of the press, and the plunger is forced into it until the sample breaks, at which point the compressive strength is noted.

The molecular sieve filter body of this invention has a pressure drop of from about 5 inches (water column) to about 20 inches (water column), at a flow rate of 100 standard cubic feet per hour, when the filter body is tested as a disc 0.5 inches thick with a diameter of 1.675 inches, and when the filter body tested is mounted in the test apparatus so that the surface area tested is defined by a circle with a diameter of 1.375 inches. As will be apparent to those skilled in the art, when a filter body with different dimensions and/or geometry is tested, one can calculate what pressure drop it would have had if it had the dimensions and geometry of said disc. The filter body is tested accordance with A.S.T.M. standard test F-778-82, "Gas Flow Resistance Testing of Filtration Media."

The molecular sieve filter body of this invention has a water capacity which is substantially greater than the water capacity of prior art filter bodies. As is known to those skilled in the art, the water capacity of a filter body is a measure of its ability to adsorb water molecules from refrigerant fluid. Thus, the term water capacity, as used in this specification, refers to weight gain experienced by the filter body under certain controlled test conditions.

In the water capacity test, a cell which is approximately $18'' \times 8'' \times 18''$ is provided. Such a cell may be purchased from the Contamination Control Incorporated Company of Kulpsvile, Pa. 19443; it consists essentially of "LEXAN" plastic (a thermoplastic carbonate-linked polymer produced by reacting bisphenol A and phosgene which is sold by the General Electric Company).

Into the cell is placed a hygrometer to measure relative humidity and temperature. A Dickson hygrometer (available from The Dickson Company of Addison, Ill. 60601) is used in the test. Both temperature and relative humidity are monitored during this test.

Into the cell are charged at least one vessel containing at least about 800 milliliters of supersaturated lithium chloride solution. Thus, e.g., one may mix 800 grams of anhydrous lithium chloride per 1000 milliliters of water to prepare such supersaturated solution.

After the supersaturated lithium chloride solution has been placed into the cell, the cell is allowed to reach equilibrium over a period of at least about 24 hours. At equilibrium, the relative humidity in the cell is held at about 15 percent and the temperature is held at about 75 degrees Fahrenheit.

The filter body to be tested is first activated by being heated to a temperature of 450 degrees Fahrenheit until it contains less than about 0.5 weight percent of water. The activated filter body to be tested is then weighed. Thereafter, it immediately is placed into the cell for five days. Each 24 hour interval, the material is weighed, and the percent water pickup is recorded. The water pickup is described by the formula: $W.P. = Wt - Wi/Wi \times 100$, wherein W.P. is the water pickup of the material (in percent), Wt is the weight of the sample at the time it is tested, and Wi is the initial weight of the activated material, prior to the test.

The water pickup of the filter body of this invention is at least about 100 percent greater than the water pickup of the prior filter dryer bodies. Thus, whereas the water pickup of the filter body of this invention is from about 7 to 16 percent, the water pickup of prior art activated alumina-molecular sieve filter-driers is generally only from about 3.5 to about 6.5 percent.

The filter body of this invention has a rate of water pickup which is substantially superior to the rate of water pickup of prior art filter bodies. Within the first 24 hours of the water adsorption test described above, it will pick up at least about 6 percent of water.

The molecular sieve filter body of this invention, when formed and heated in contact with metal or other substrate in accordance with the procedures described elsewhere in this specification, forms a bond of great strength.

In another embodiment of this invention, the filter body of this invention is used in a gas chromatograph.

The process of this invention may be used to prepare molecular sieve filter bodies using molecular sieves with different properties than the ones used for filter-dryer bodies for presently used refrigerant fluids. By way of illustration, one may use as a starting material a molecular sieve which has a pore size greater than 4 angstroms and/or has a particle size such that substantially all of its particles are between 1 micron to about 2,000 microns.

In another embodiment of the invention, the molten mixture of polyphenylene sulfide and molecular sieve, instead of being conveyed to a mold, is fed through an extruder, wherein it is formed by a die. By this process, honeycomb filter bodies may be formed which may be useful in, e.g., catalysis of ozone.

In yet another embodiment of the invention, the polyphenylene sulfide is electrostatically applied to dry molecular sieve material. In this embodiment, because water need not be removed from the system, energy costs for the process are reduced.

In another embodiment of the invention, the polyphenylene sulfide material is mixed with binder and water, and the mixture thus formed is then added to the molecular sieve material.

The following examples are presented to illustrate the claimed invention but are not to be deemed limitative thereof. Unless otherwise specified, all parts are by weight and all temperatures are in degrees centigrade.

EXAMPLE 1

100 grams of a molecular sieve material identified as "type 4AXH6" (obtained from U.O.P. Molecular Sieves of 25111 Country Club Boulevard, North Olmstead, Ohio) were mixed with 20 grams of water. The wetted sieve material was then allowed to stand under ambient conditions for seven days.

Thereafter, the wetted sieve material was mixed with 15 grams of additional water and a 5.0 grams of a prepared binder solution. The binder solution was prepared by mixing 1000 grams of water with 0.4 grams of polyethylene glycol ("POLYOX 301," obtained from the Union Carbide Chemicals and Plastics Company, Specialty Chemicals Division, Danbury, Conn.) in a Waring blender. The deactivated molecular sieve material, water, and binder solution were mixed together for about 2 minutes.

Thereafter, 12 grams of polyphenylene sulfide powder ("NACOTE PRO-1" RESIN, obtained from the Whitford Corporation of West Chester, Pa.) were added to the mixture and mixed for an additional 2 minutes until the molecular sieve material was uniformly coated.

Thereafter, 25 grams of the mixed material were weighed out and charged into a die mold. The mold had a diameter of 1.675 inches and a depth of 2.0 inches.

The material was compressed to a density of 16.9 grams per cubic inch, which required a pressure of about 750 pounds per square inch. The green body produced in the press was a disc with an outside diameter of 1.675 inches and a thickness of about 0.585 inches.

The pressed body was placed into a furnace (model number 59544, manufactured by the Lindberg division of Sola Basic Industries, 304 Hart Street, Watertown, Wis.) and heated at a rate of 300 degrees Fahrenheit per hour to a temperature of 635 degrees Fahrenheit; thereafter it was held at 635 degrees Fahrenheit for 2 hours. The furnace was then allowed to cool naturally, at a rate of about 150 degrees Fahrenheit per hour.

The resulting body had a measured pressure drop of 14 inches (water column) at 100 standard cubic feet per hour flow rate. The body also had a measured water capacity of 15 percent.

EXAMPLE 2

The procedure of Example 1 was substantially followed with the exception that the binder solution used was 10 grams of a paraffin wax emulsion ("MOBILCER J-WAX," obtained from the Mobil Chemical Company). The filter body thus produced had properties comparable to that of the body of Example 1.

EXAMPLE 3(Start Here)

A mixture of molecular sieve material, binder, a polyphenylene sulfide was prepared in substantial accordance with the procedure of Example 1. Twelve grams of this mixture were charged into a copper tube (with a 0.75 inch outer diameter, a 0.035 inch wall thickness, and a length of 6 inches) containing a press-fit screen. After the material was charged into the tube, another screen was pressed into the tube so that the charged material was compressed between the two screens.

The tube assembly was then placed in an atmosphere controlled furnace (which was about 11 inches in diameter and 16 inches in height) and heated to a temperature of 630 degrees Fahrenheit while being contacted with flowing nitrogen at a rate of 5 standard cubic feet per minute; the nitrogen atmosphere was used to prevent the copper tube from oxidizing. After heating the assembly for 30 minutes at this temperature, the furnace was allowed to cool to room temperature while the assembly was contacted with nitrogen flowing at 2 standard cubic feet per minute.

The tube was then removed from the furnace and cut lengthwise, using a bandsaw. The material in the tube was found to be well bonded to both the wall of the copper tube and to itself.

EXAMPLE 4

Fifty grams of the molecular sieve material described in Example 1 were mixed with 10 grams of water and allowed to stand under ambient conditions for seven days. Thereafter, the wetted sieve material was then mixed for about 2 minutes with 15 grams of additional water, 50 grams of activated alumina ("COMPALOX" AN/V-801, obtained from Lonaz, Inc. of Fair Lawn, N.J.) and 5 grams of the prepared binder solution described in claim 1.

This material was then processed in accordance with the procedure of claim 1. The resulting body had a measured pressure drop of 14 inches (water column) at 100 standard cubic feet per hour flow rate. The body also had a measured water capacity of 9.6 percent.

It is to be understood that the aforementioned description is illustrative only and that changes can be made body is fired, at least about 80 percent of the polyphenylene sulfide particles have a maximum dimension which is from about 5 to about 200 microns.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

We claim:

1. A filter body comprised of at least about 75 weight percent of molecular sieve material and from about 9 to about 20 weight percent of polyphenylene sulfide, wherein said filter body has a compressive strength of at least about 500 pounds per square inch, a pressure drop of from about 5 to about 20 inches (water column), a water pickup of at least about 11 weight percent, and an initial 24-hour water pickup of at least about 6 weight percent, and wherein:
    (a) said molecular sieve has the formula $M_{2/n}O:Al_2O_3:SiO_2$, wherein:
        1. M is a metal ion selected from the group consisting of sodium, potassium, calcium, strontium, barium, cesium, magnesium, and mixtures thereof, and
        2. n is the valence of the metal ion and is selected from the group consisting of 1 and 2;
    (b) substantially all of the pores of said molecular sieve material are smaller than about 4 angstroms; and
    (c) substantially all of the particles of said molecular sieve are larger than 100 microns and smaller than 2,000 microns.

2. The filter body as recited in claim 1, wherein M is selected from the group consisting of sodium, potassium, and mixtures thereof.

3. A mixture comprised of at least about 75 weight percent of the molecular sieve material recited in claim 1 and from about 9 to about 20 weight percent of polyphenylene sulfide.

4. The mixture as recited in claim 3, wherein M is selected from the group consisting of sodium, potassium, and mixtures thereof.

5. The mixture as recited in claim 4, wherein at least about 80 percent of the particles of said polyphenylene sulfide have a maximum dimension which is from about 5 to about 200 microns.

6. A process for preparing the filter body recited in 1, comprising the steps of:
    (a) providing a mixture comprised of at least about 75 weight percent of the molecular sieve material recited in claim 1 and from about 9 to about 20 weight percent of polyphenylene sulfide; and
    (b) heating said mixture to a temperature of from about 600 to about 650 degrees Fahrenheit.

7. The process as recited in claim 6, wherein said mixture of molecular sieve material and polyphenylene sulfide also is comprised of from about 1 to about 3 weight percent of green binder.

8. The process as recited in claim 7, wherein said at least about 80 percent of the particles of said polyphenylene sulfide have a maximum dimension of from about 5 to about 200 microns.

9. The process as recited in claim 8, wherein, prior to time said mixture is heated to a temperature of from about 600 to about 650 degrees Fahrenheit, it is pressed into a green body.

10. The process as recited in claim 9 wherein said mixture is heated until it contains less than about 0.5 weight percent of moisture.

11. The process as recited in claim 6, comprising the steps of heating said molecular sieve material to a temperature of from about 600 to about 650 degrees Fahrenheit, and thereafter mixing said heated molecular sieve material with said polyphenylene sulfide.

12. The process as recited in claim 11, wherein, said molecular sieve material is mixed with said polyphenylene sulfide material while said materials are heated to a temperature of from about 600 to about 650 degrees Fahrenheit.

13. The process as recited in claim 12, wherein, after said mixture of said molecular sieve material and said polyphenylene sulfide has been provided, it is fed into a mold.

14. The process as recited in claim 13 wherein, after said mixture has been fed into said mold, it is then compacted in said mold until a molded article with a density of from about 10 to about 25 grams per cubic inch is produced.

15. A composite body consisting essentially of a metal material bonded to the molecular sieve filter body recited in claim 1.

16. The composite body as recited in claim 15, wherein said metal material is a metal screen.

17. The composite body as recited in claim 15, wherein said metal material is a metal plate.

18. A composite body consisting essentially of an activated alumina filter body bonded to the molecular sieve filter body recited in claim 1.

* * * * *